United States Patent
Chung et al.

(10) Patent No.: US 8,644,865 B2
(45) Date of Patent: Feb. 4, 2014

(54) METHOD OF MEASURING INTERFERENCE

(75) Inventors: Jae Hoon Chung, Gyeonggi-do (KR); Hyun Soo Ko, Gyeonggi-do (KR); Moon Il Lee, Gyeonggi-do (KR); Bin Chul Ihm, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 12/921,148

(22) PCT Filed: Mar. 5, 2009

(86) PCT No.: PCT/KR2009/001099
§ 371 (c)(1),
(2), (4) Date: Sep. 3, 2010

(87) PCT Pub. No.: WO2009/110756
PCT Pub. Date: Sep. 11, 2009

(65) Prior Publication Data
US 2011/0009137 A1    Jan. 13, 2011

Related U.S. Application Data

(60) Provisional application No. 61/034,120, filed on Mar. 5, 2008.

(30) Foreign Application Priority Data

Jul. 23, 2008  (KR) .................. 10-2008-0071821

(51) Int. Cl.
*H04B 15/00*  (2006.01)
*H04B 7/00*  (2006.01)
*H04B 17/00*  (2006.01)

(52) U.S. Cl.
USPC ....... 455/501; 455/507; 455/67.3; 455/67.13; 455/63; 455/114.2; 455/296; 455/115; 455/115.1

(58) Field of Classification Search
None
See application file for complete search history.

(56) References Cited

U.S. PATENT DOCUMENTS

| | | | |
|---|---|---|---|
| 2007/0153735 A1* | 7/2007 | Frederiksen et al. | 370/329 |
| 2008/0008206 A1* | 1/2008 | Cho et al. | 370/430 |
| 2008/0013500 A1* | 1/2008 | Laroia et al. | 370/338 |
| 2008/0232504 A1* | 9/2008 | Ma et al. | 375/267 |
| 2009/0245197 A1* | 10/2009 | Ma et al. | 370/330 |

FOREIGN PATENT DOCUMENTS

| | | |
|---|---|---|
| CN | 1878392 | 12/2006 |
| KR | 10-0657506 | 12/2006 |
| WO | 2005/043791 | 5/2005 |
| WO | 2006-131042 | 12/2006 |

OTHER PUBLICATIONS

NEC Group, "Physical channel mapping for uni-cast", R1-060056, TSG-RAN WG1 LTE Ad hoc, Jan. 2006.

(Continued)

*Primary Examiner* — Yuwen Pan
*Assistant Examiner* — Fanghwa Wang
(74) *Attorney, Agent, or Firm* — Lee, Hong, Degerman, Kang & Waimey

(57) ABSTRACT

A method of measuring interference to perform efficient data communication is disclosed. A method of measuring interference of neighboring cells comprises allocating one or more first resource elements, to which pilot signals are allocated, to predetermined symbol regions included in a first resource block; allocating one or more second resource elements for measuring interference of the neighboring cells to a first symbol region of the predetermined symbol regions; and measuring interference of the neighboring cells using the one or more second resource elements.

16 Claims, 11 Drawing Sheets

(56) References Cited

OTHER PUBLICATIONS

Samsung, "DL reference signal structure of the intra Node B cells: CDM Vs. FDM", R1-062223, 3GPP TSG RAN WG1 Meeting #46, Aug. 2006.

Catt, "Further consideration on the downlink reference symbols of beam-forming for EUTRA TDD", R1-062791, 3GPP TSG RAN WG1 Meeting #46bis, Oct. 2006.

The State Intellectual Property Office of the People's Republic of China Application Serial No. 200980107818.0, Notice of Allowance dated May 31, 2013, 3 pages.

* cited by examiner

METHOD OF MEASURING INTERFERENCE

CROSS-REFERENCE TO RELATED APPLICATIONS

This application is the National Stage filing under 35 U.S.C. 371 U.S. of International Application No. PCT/KR2009/001099, filed on Mar. 5, 2009, which claims the benefit of earlier filing date and right of priority to Korean Application No. 10-2008-0071821, filed on Jul. 23, 2008, and also claims the benefit of U.S. Provisional Application Ser. No. 61/034,120, filed on Mar. 5, 2008, the contents of all of which are incorporated by reference herein in their entireties.

TECHNICAL FIELD

The present invention relates to a method of measuring interference to perform efficient data communication in a wireless access system.

BACKGROUND ART

Hereinafter, a multi-cell mobile communication system will be described in brief.

FIG. 1 is a diagram illustrating a basic concept of a cellular based mobile communication system.

Referring to FIG. 1, each base station (BS) can control a specific cell region allocated thereto. Each base station can provide a specific mobile communication service to a mobile station (MS) within a given zone. All base stations may provide a single mobile communication service or different mobile communication services.

A multi-cell based mobile communication system can be designed such that all base stations of a specific zone use a single frequency region. Accordingly, the multi-cell based mobile communication system may be affected by interference of several radio waves from neighboring cells. If interference generated from neighboring cells is not properly handled, system throughput may be affected by the interference.

For example, in FIG. 1, a specific mobile station (MS) can be located between cells of BS 1 and BS 2. Since the BS 1 and the BS 2 use a single frequency region, signals transmitted from the two base stations BS 1 and BS 2 similarly affect the mobile station in view of the location. Accordingly, if interference from other base station in the cell boundary is not considered when a communication system is configured, problems occur in that channel quality information (CQI) fed back from the mobile station to the base station is measured inexactly and system throughput cannot be optimized.

In a wireless access system, interference by other signals, unexpected noise, etc. may cause several problems. Generally, noise means an unwanted signal generated spontaneously, and interference means an unwanted signal generated artificially.

Examples of the unwanted noise include background noise, artificial noise, mutual modulation, and noise generated by a receiver. The unwanted noise may occur due to several reasons. Examples of a noise source generated spontaneously include atmospheric disturbance, background noise, and thermal noise generated in a receiver. If the unwanted noise can be reduced in the wireless access system, system throughput can be improved directly.

An example of the artificial noise source includes interference noise. The interference noise can be generated by signals of other communication system or electric system in a single band. Namely, a single frequency band may be affected by interference from other communication system or electric system intentionally or spontaneously.

DETAILED DESCRIPTION OF THE INVENTION

Technical Problems

In order to provide an efficient communication environment, it is preferable to seek various methods for reducing noise and interference. The present invention has been devised to substantially obviate one or more problems due to limitations and disadvantages of the related art. An object of the present invention is to provide an efficient communication method.

Another object of the present invention is to provide a method of optimizing a system by exactly measuring CQI considering a magnitude of interference from neighboring cells.

Other object of the present invention is to provide a method of measuring interference by transmitting a null signal to a resource region where pilot symbols (or reference signals) of a neighboring cell are located, so as to exactly measure a magnitude of interference from neighboring cells.

Technical Solutions

In order to solve the above technical problems, the present invention relates to a method of measuring interference to perform efficient data communication in a wireless access system.

In one aspect of the present invention, a method of measuring interference of neighboring cells comprises allocating one or more first resource elements, to which pilot signals are allocated, to predetermined symbol regions included in a first resource block; allocating one or more second resource elements for measuring interference of the neighboring cells to a first symbol region of the predetermined symbol regions; and measuring interference of the neighboring cells using the one or more second resource elements.

Preferably, the one or more second resource elements do not transmit data to measure a magnitude of interference of the neighboring cells. At this time, it is preferable that the one or more second resource elements are not allocated to the one or more first resource element, to which pilot signals are allocated, and a resource element to which a control channel is allocated.

At this time, the one or more second resource elements are allocated to the predetermined symbol regions to which the one or more first resource elements are allocated. Also, the number of the first resource elements to which pilot signals are allocated is the same as or different from the number of the second resource elements. Namely, the number of the first resource elements is greater or smaller than the number of the second resource elements.

Furthermore, according to one embodiment of the present invention, the method further comprises allocating the one or more first resource elements to predetermined symbol regions included in a second resource block. At this time, it is preferable that the one or more second resource elements are not allocated to the second resource block.

Furthermore, according to one embodiment of the present invention, the method further comprises allocating the one or more first resource elements to predetermined symbol regions included in a second resource block; and allocating the one or more second resource elements for measuring interference of the neighboring cells to a first symbol region of the predetermined symbol regions included in the second resource block. At this time, interference of the neighboring cells is measured using a first antenna in the first resource block, and interference of the neighboring cells is measured using a second antenna in the second resource block.

Furthermore, interference of the neighboring cells is measured in the second resource block by predicting interference of the second antenna based on interference of the neighboring cells measured using the first antenna.

At this time, interference of the neighboring cells is measured using a first antenna and a second antenna in the first resource block, and interference of the neighboring cells is measured using a third antenna and a fourth antenna in the second resource block.

Furthermore, according to another embodiment of the present invention, interference of the neighboring cells is measured by only mobile stations located in a cell boundary.

Furthermore, according to still another embodiment of the present invention, allocation of the second resource elements is determined in accordance with subframe index.

Furthermore, according to further still another embodiment of the present invention, allocation location of the second resource elements is determined in accordance with subframe index.

Furthermore, according to further still another embodiment of the present invention, the second resource elements of a second cell and a third cell are allocated to the first resource element to which pilot signals of a first cell are allocated, the second resource elements of the first cell and the third cell are allocated to the first resource element to which pilot signals of the second cell are allocated, and the second resource elements of the second cell and the third cell are allocated to the first resource element to which pilot signals of the third cell are allocated, whereby the first cell, the second cell and the third cell cooperatively measure interference of the neighboring cells.

Furthermore, according to further still another embodiment of the present invention, pilot signals of a second cell and a third cell are not allocated to the first resource element to which pilot signals of the first cell are allocated, pilot signals of the first cell and the third cell are not allocated to the first resource element to which pilot signals of the second cell are allocated, and pilot signals of the second cell and the third cell are not allocated to the first resource element to which pilot signals of the third cell are allocated. In this way, the first cell, the second cell and the third cell cooperatively measure interference of the neighboring cells.

Advantageous Effects

According to the present invention, the following effects can be obtained.

First of all, efficient communication can be performed in accordance with the embodiments of the present invention.

Second, as the magnitude of interference from neighboring cells is exactly measured, the system can be optimized.

Finally, since a null signal is used to measure interference from the neighboring cells, interference can be measured more exactly.

BEST MODE FOR CARRYING OUT THE INVENTION

Figure 1:
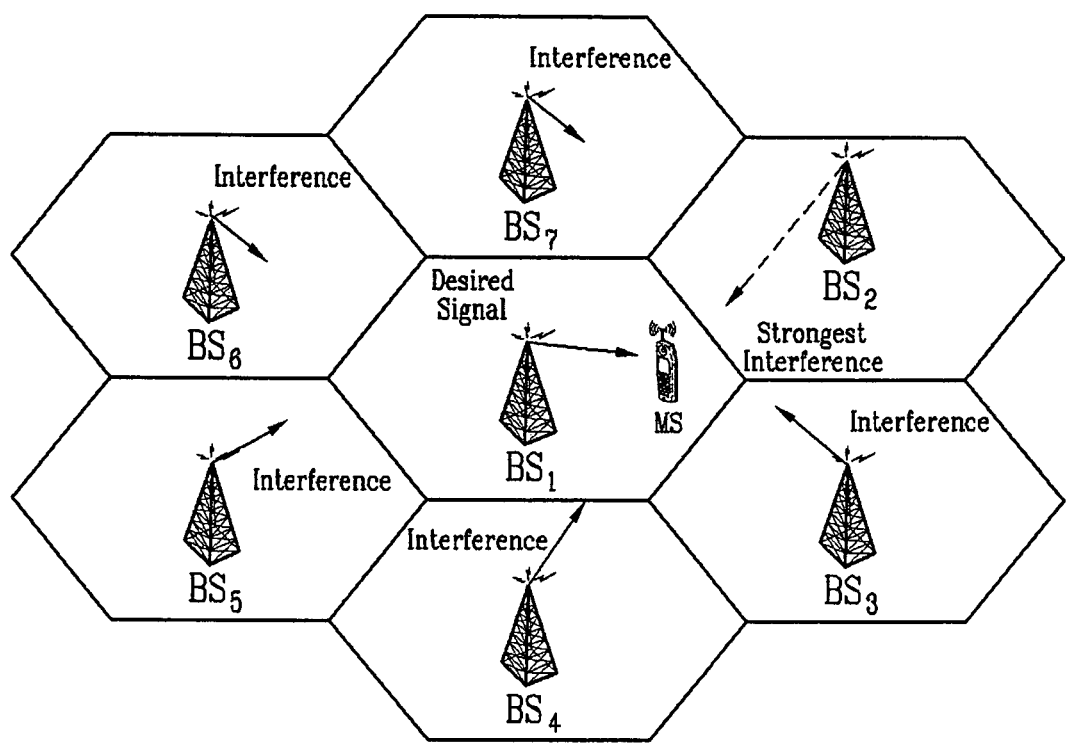
FIG. 1 is a diagram illustrating a basic concept of a cellular based mobile communication system.

The present invention is directed to a method of measuring interference to perform efficient data communication in a wireless access system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment and a mobile subscriber station.

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Specific terminologies hereinafter described are provided to assist understanding of the present invention, and various modifications can be made in the specific terminologies within the range that they do not depart from technical spirits of the present invention.

Figure 2:
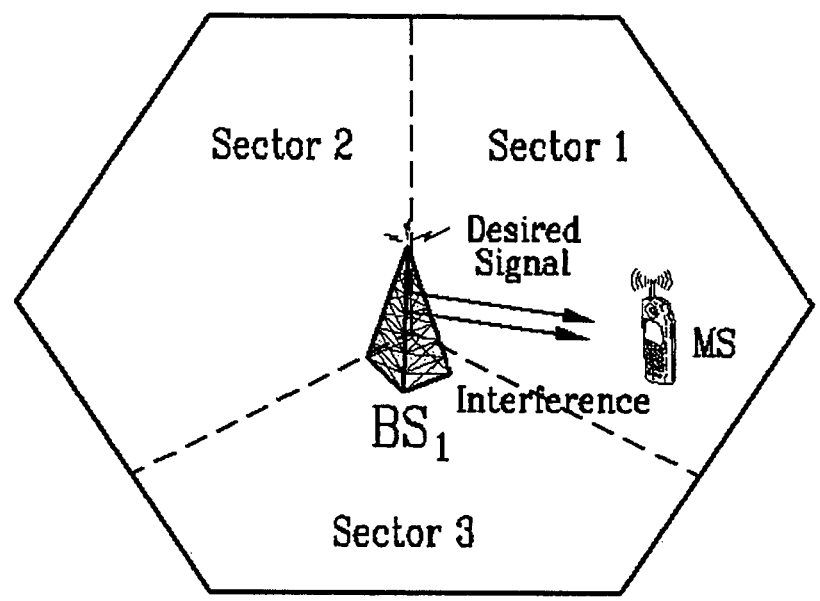
FIG. 2 is a diagram illustrating an example of a communication system which independently uses sectors under an independent cell environment.

FIG. 2 is a diagram illustrating an example of a communication system which independently uses sectors under an independent environment.

In an independent environment as illustrated in FIG. 2, a base station can independently use its cell regions. Namely, the base station can sector its cell regions to reduce interference from a user of other cell. For example, the base station (BS1) can manage sector antennas by dividing its cell into three sectors. An antennas allocated to each sector can receive only a signal received in a direction of a specific angle (preferably, 120°).

The base station can give great antenna gain to signals received with a specific angle and small antenna gain to signals received with other angles using the sector antennas. Accordingly, a user included in the first sector can reduce interference from users included in other sector regions. However, even though the base station sectors its cell regions, it is difficult to remove interference caused by neighboring sectors in the technology generally used.

Figure 3:
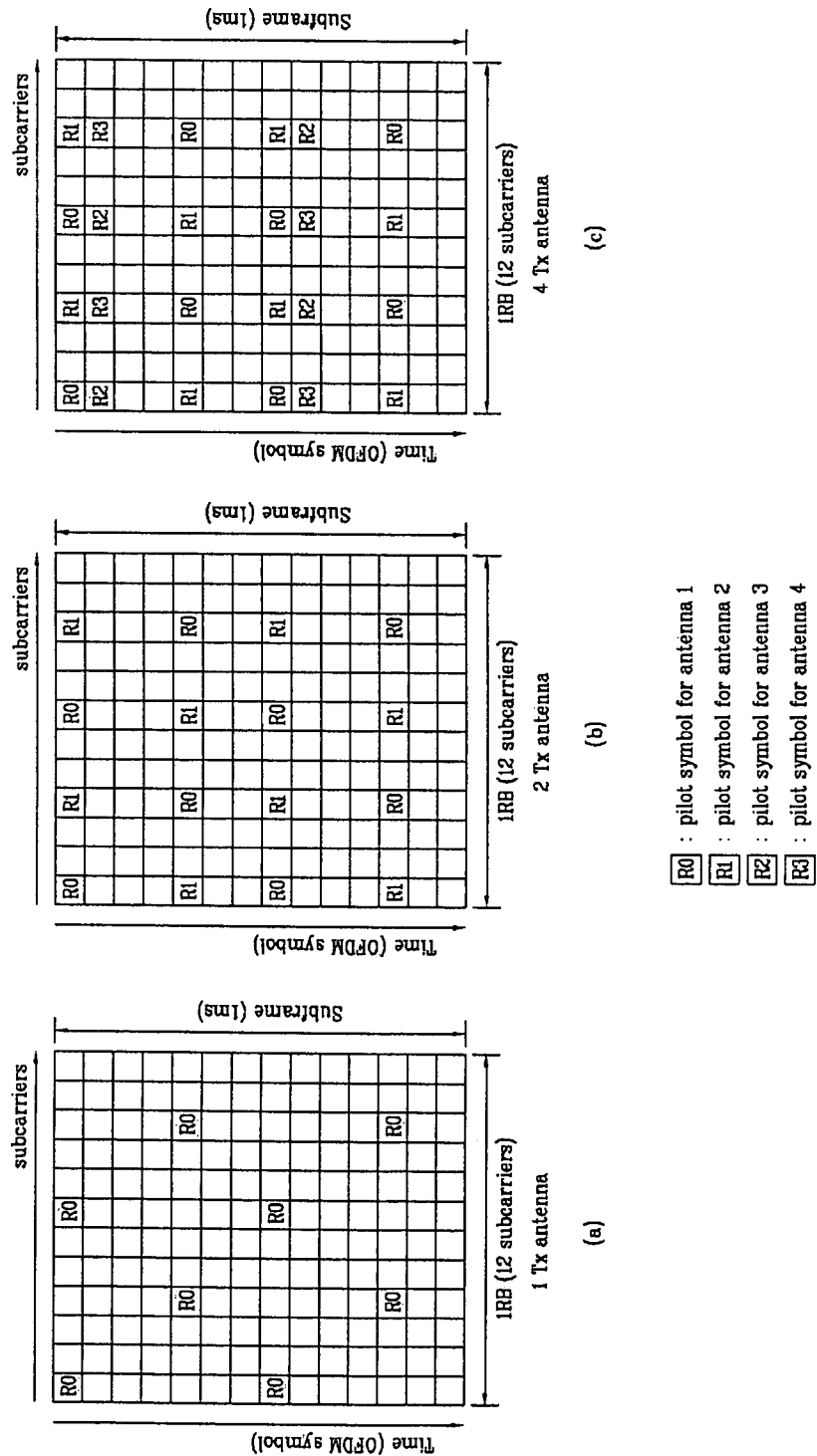
FIG. 3 is a diagram illustrating an example of a pilot symbol structure according to the number of transmitting antennas.

FIG. 3 is a diagram illustrating an example of a pilot symbol structure according to the number of transmitting antennas, Pilot symbols are generally used in the field of data transmission. The pilot symbols are used in a transmitter and a receiver to obtain timing of each channel or reference carriers for demodulation. In various communication systems, the pilot symbols can be used as various terminologies such as reference signals. However, in the embodiments of the present invention, the pilot symbols mean all symbols or signals transmitted at high output without real data to adjust synchronization of channel, synchronize phase of carriers, or assist in acquiring base station information.

FIG. 3 illustrates locations of pilot symbols of each transmitting antenna in accordance with the number of the transmitting antennas. In FIG. 3, Ri represents a pilot symbol of the ith transmitting antenna. Also, one transmitting antenna is used in FIG. 3(a), two transmitting antennas are used in FIG. 3(b), and four transmitting antennas are used in FIG. 3(c).

In FIG. 3, it is noted that the respective pilot symbols are arranged at a constant frequency time interval and a constant time interval. If the number of transmitting antennas increases as illustrated in FIG. 3, overhead of the pilot symbols may increase.

If the pilot symbol structure of FIG. 3 is used for the sector 1 of FIG. 2, the sector 2 and the sector 3 can guard the pilot symbols through shift of subcarrier unit or OFDM symbol unit in a frequency region or a time region so that collision does not occur in the pilot symbols between cells.

Hereinafter, a method of removing interference through shift of the pilot symbols in a unit of subcarrier or OFDM symbol will be described.

Figure 4:
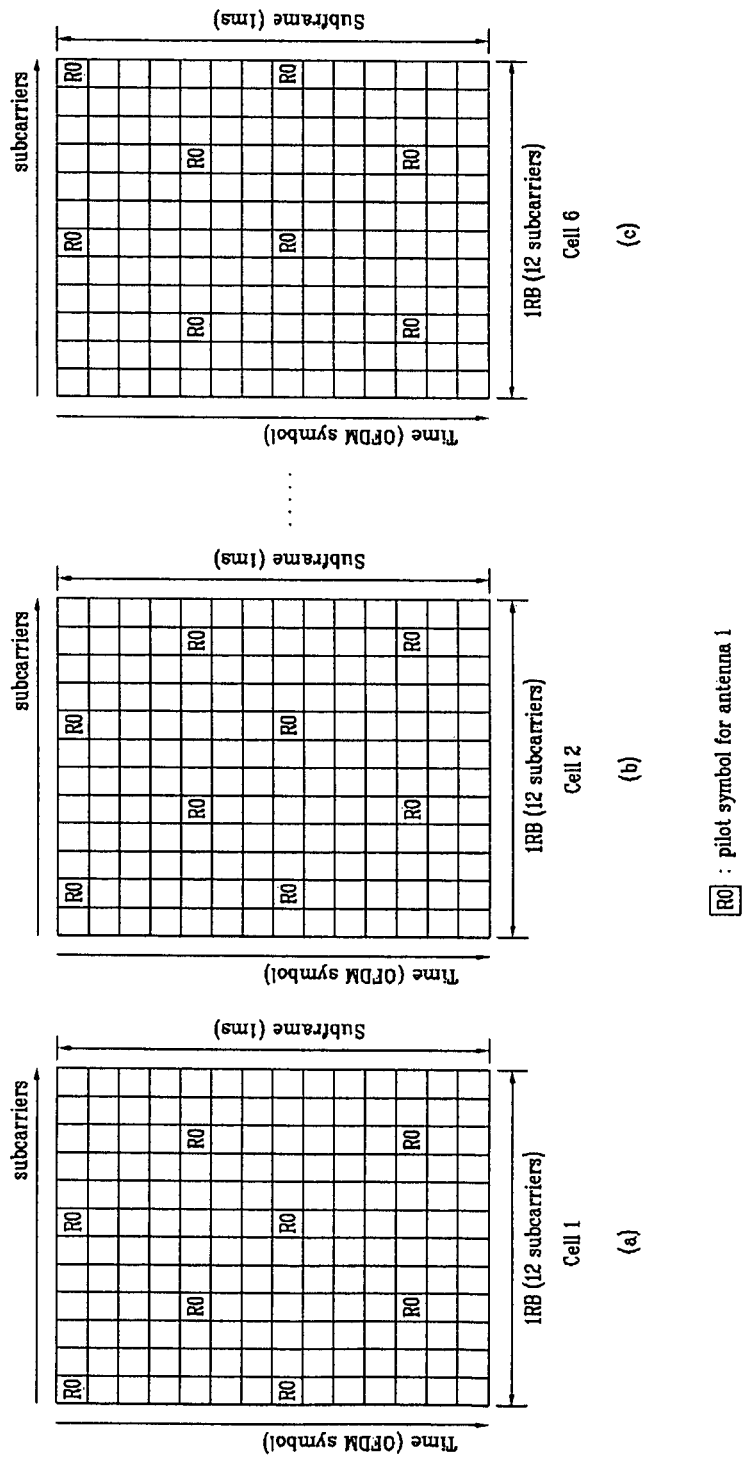
FIG. 4 is a diagram illustrating an example of a method of shifting pilot symbols in a unit of subcarrier when a single transmitting antenna is used.

FIG. 4 is a diagram illustrating an example of a method of shifting pilot symbols in a unit of subcarrier when a single transmitting antenna is used.

Referring to FIG. 4, in case of a transmitting antenna (1 Tx antenna) of FIG. 4(a), it is noted that the respective pilot symbols are located in the frequency region at an interval of six subcarriers. Accordingly, if shift of subcarrier unit is performed in the frequency region, the pilot symbols can be arranged in different locations in at least five cells. Namely, it is noted in FIG. 4 that collision of the pilot symbols is avoided through frequency shift in several neighboring cells (cell 1 to cell 6).

However, even though sectorization is performed or the pilot symbols are shifted in a unit of frequency, it is difficult to fully remove interference from neighboring cells or neighboring sectors. Accordingly, a method of exactly measuring interference from neighboring cells or neighboring sectors will be required.

Figure 5:
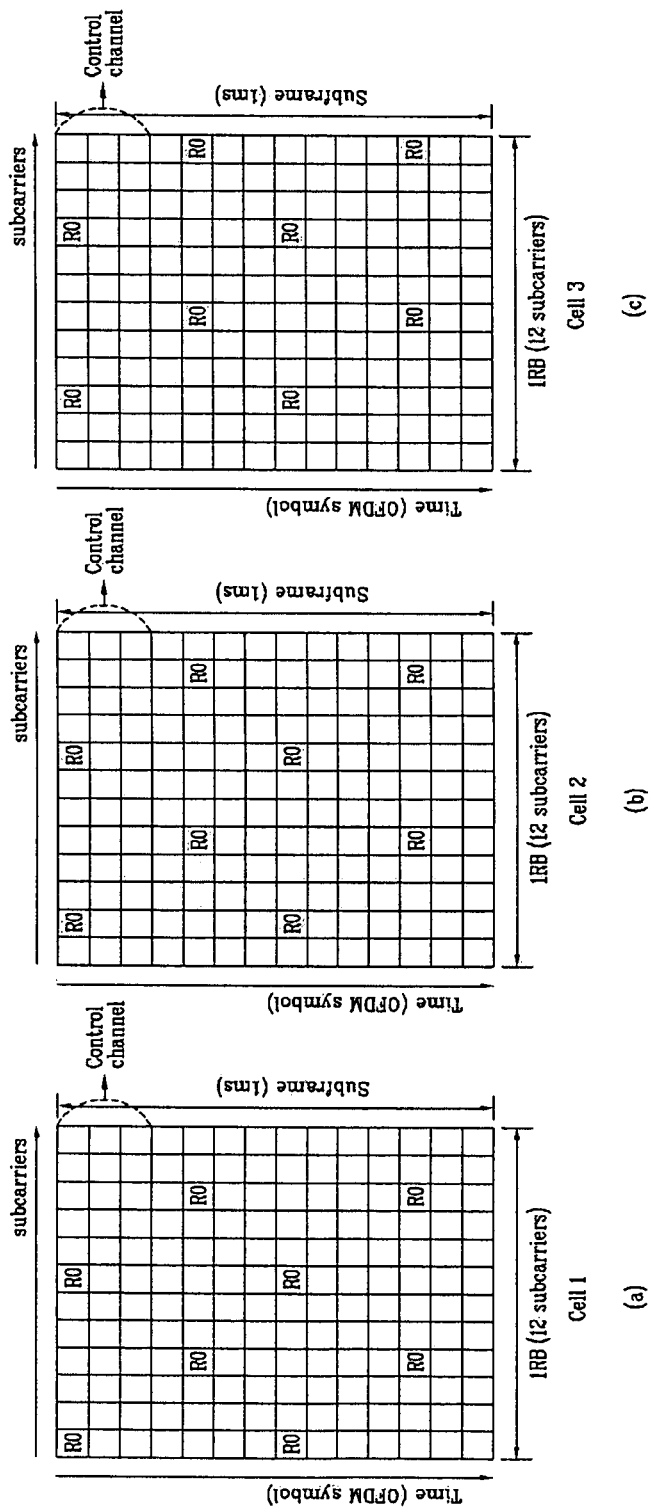
FIG. 5 is a diagram illustrating another example of a method of shifting pilot symbols in a unit of subcarrier when a single transmitting antenna is used.

FIG. 5 is a diagram illustrating another example of a method of shifting pilot symbols in a unit of subcarrier when a single transmitting antenna is used.

In FIG. 5, if one transmitting antenna is used, frequency-shifted specific pilot symbols can be used in three neighboring cells. Accordingly, collision between the pilot symbols may not occur in the three neighboring cells. However, a problem occurs in that interference from neighboring cells cannot be removed despite that collision of the pilot symbols transmitted between the neighboring cells has been avoided through frequency shift as illustrated in FIG. 5.

One resource block (RB) used in the embodiments of the present invention can include twelve (12) subcarriers and fourteen (14) OFDM symbols. Also, a resource element (RE) used in the embodiments of the present invention is a basic unit constituting resource blocks, and can be allocated to the resource block in a unit of 1 OFDM symbol and 1 subcarrier. Data signals, pilot signals and null signals can be allocated to the resource element. In the embodiments of the present invention, the resource element to which pilot signals are allocated can be referred to as pilot symbols.

Magnitudes and allocation locations of the resource block (RB), the resource element (RE) and control channel may be varied depending on the channel status or user's requirements. At this time, the OFDM symbol region means a whole frequency band in predetermined OFDM symbols. Namely, in the embodiments of the present invention, one OFDM symbol region can be represented by 1 OFDM symbol X 12 subcarriers.

In the embodiments of the present invention, a null resource element (RE) can be used to measure interference of neighboring cells (or neighboring sectors). The null RE means a resource element to which a null signal is allocated. The null signal is to measure interference of neighboring cells and does not include any data. Although the pilot signals are used to measure interference of neighboring cells, the null RE can be used to more exactly measure interference.

The null RE can be configured by various methods. Basically, no null signal is allocated to the RE to which the pilot signals are allocated. Also, it is preferable that the null RE is not used in a region to which the control channel is allocated.

Hereinafter, an arrangement structure of the pilot symbols and the null RE for exactly measuring interference of neighboring cells while minimizing interference from the neighboring cells will be described.

1. General Null RE Structure

A pilot symbol structure of a specific cell can equally be applied to all resource blocks (RB). Likewise, the null RE can equally be configured to all RBs. In this case, mobile stations allocated to different RBs can use the null RE to obtain interference magnitude of other RBs not allocated thereto. The obtained interference magnitude can be used to feed channel quality information (CQI) back or detect a receiving signal.

Figure 6:
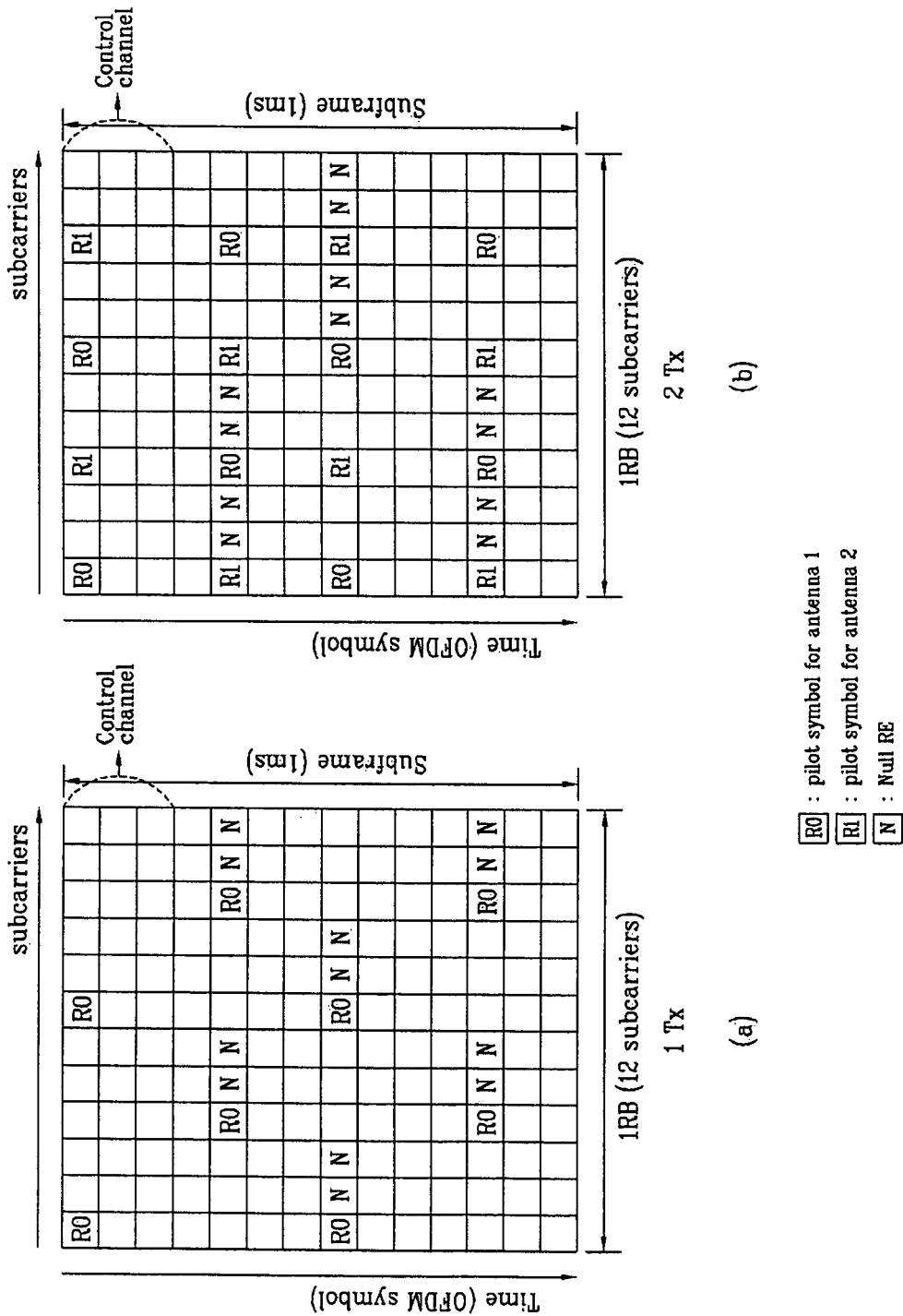
FIG. 6 is a diagram illustrating an example of a method of allocating a null RE to all OFDM symbol regions which include pilot symbols, in accordance with one embodiment of the present invention.

FIG. 6 is a diagram illustrating an example of a method of allocating a null RE to all OFDM symbol regions which include pilot symbols, in accordance with one embodiment of the present invention.

In FIG. 6, 'R0' represents a pilot signal of the first antenna, 'R1' represents a pilot signal of the second antenna, and 'N' represents a null RE. At this time, one pilot signal can be allocated to one RE. Also, it is preferable that no null RE is allocated to a region of a specific RB, to which a control channel is allocated. At this time, the control channel can be allocated to three OFDM symbol regions.

FIG. 6(a) illustrates a null RE structure when there is provided one transmitting antenna. In this case, FIG. 6(a) illustrates that two null REs are used whenever one pilot signal is allocated. FIG. 6(B) illustrates a null RE structure when there are provided two transmitting antennas. In this case, FIG. 6(b) illustrates that two null REs are used whenever one pilot signal is allocated.

The resource block (RB) of FIG. 6 can be used in such a manner that allocation locations of null REs are exchanged with those of pilot signals in three neighboring cells. The null REs used in FIG. 6 can be allocated to all OFDM symbol regions to which pilot symbols are allocated. Also, in FIG. 6, the number and allocation locations of the null REs can be varied depending on the channel status or user's requirements.

Figure 7:
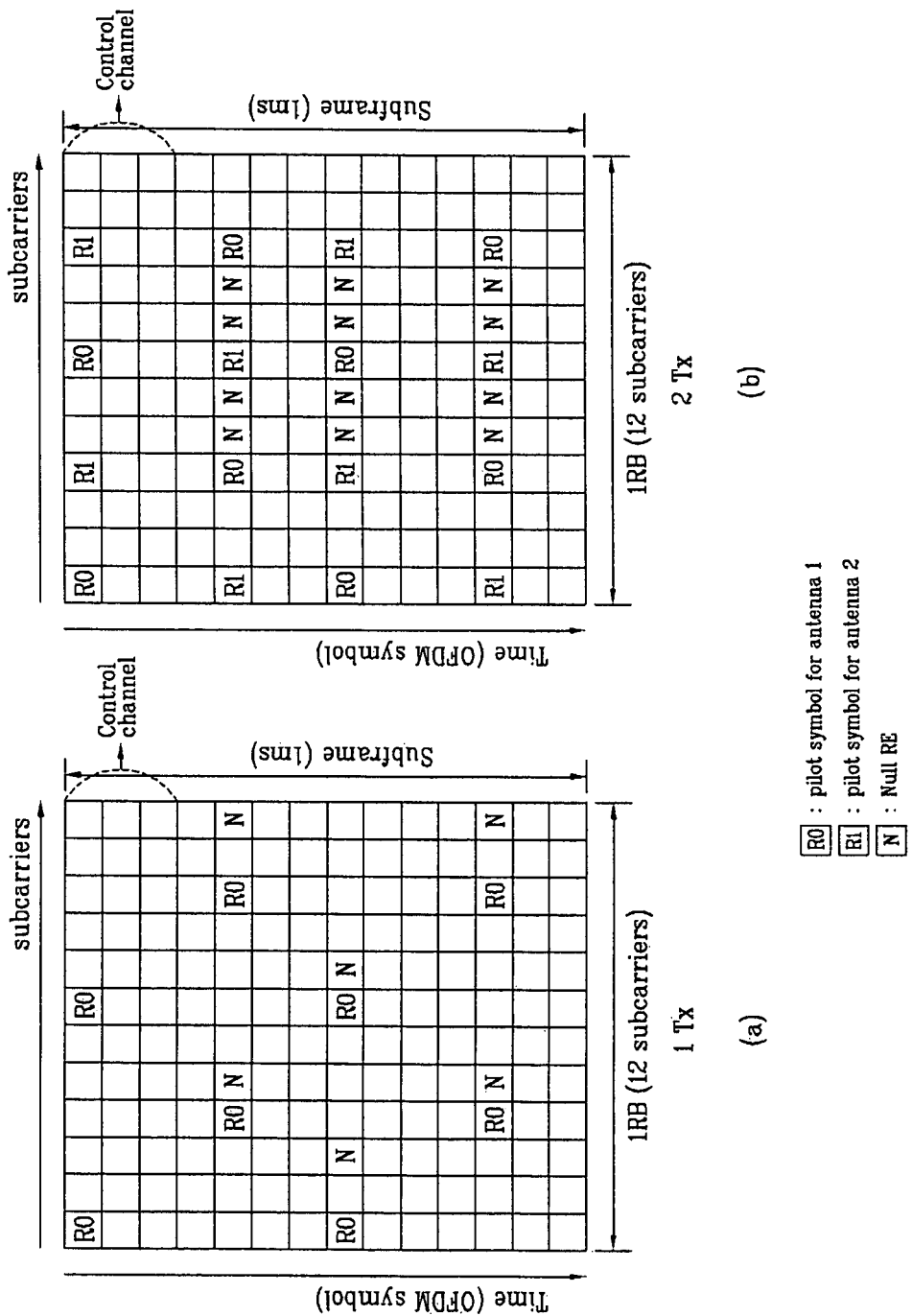
FIG. 7 is a diagram illustrating an example of a method of allocating a null RE to all OFDM symbol regions to which pilot symbols are allocated, in accordance with one embodiment of the present invention.

FIG. 7 is a diagram illustrating an example of a method of allocating a null RE to all OFDM symbol regions to which pilot symbols are allocated, in accordance with one embodiment of the present invention.

FIG. 7 is similar to FIG. 6 except that pilot symbols and null REs are allocated differently from FIG. 6. FIG. 6 and FIG. 7 illustrate that null REs are used for all OFDM symbols to which pilot signals are allocated.

FIG. 7(a) illustrates that one null RE is allocated to one pilot signal when there is provided one transmitting antenna. In this case, the null RE can be allocated to another RE within the OFDM symbol regions to which pilot symbols are allocated. FIG. 7(b) illustrates that one null RE is allocated to one pilot symbol. In FIG. 7(a) and FIG. 7(b), the null RE and the pilot symbols can be used at different locations in three neighboring cells.

FIG. 6 and FIG. 7 illustrate that a null RE is used in an OFDM symbol region which includes pilot symbols among the other OFDM symbol regions except for the control channel. Also, in view of one RB, null RE(s) can equally be allocated to predetermined OFDM symbols. The same number of null REs as the number of pilot symbols (or reference signals (RS)) of each transmitting antenna can be used.

Figure 8:
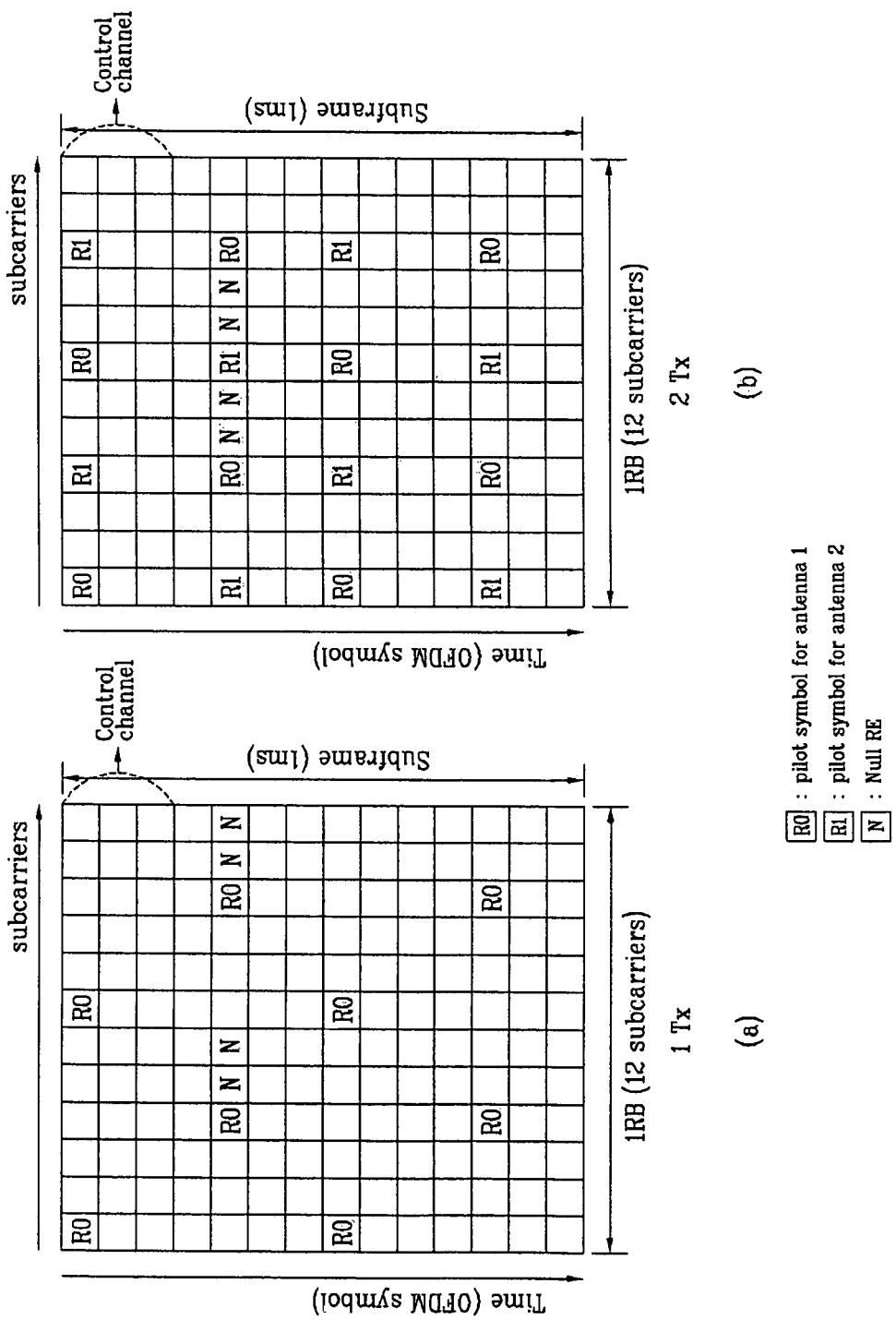
FIG. 8 is a diagram illustrating an example of a method of allocating a null RE to only a specific OFDM symbol region which includes pilot symbols among OFDM symbol regions which include pilot symbols, in accordance with one embodiment of the present invention.

FIG. 8 is a diagram illustrating an example of a method of allocating a null RE to only a specific OFDM symbol region which includes pilot symbols among OFDM symbol regions which include pilot symbols, in accordance with one embodiment of the present invention.

If a wireless channel is little affected by Doppler effect, it may be regarded that there is little change in the channel status according to time. Namely, in a state that there is provided a mobile status of low speed not high speed or wireless communication with a mobile station which is at a standstill is used, overhead may increase if a null RE is used in all OFDM symbol regions which include pilot symbols.

Accordingly, if a null RE is used in only a specific OFDM symbol region, it is possible to minimize overhead while obtaining interference magnitude of neighboring cells. For example, FIG. 8 illustrates a method of using a null RE in only an OFDM symbol region which includes a first pilot symbol. However, the number of OFDM symbol regions which use a null RE can be varied depending on the channel status or user's requirements.

Figure 9:
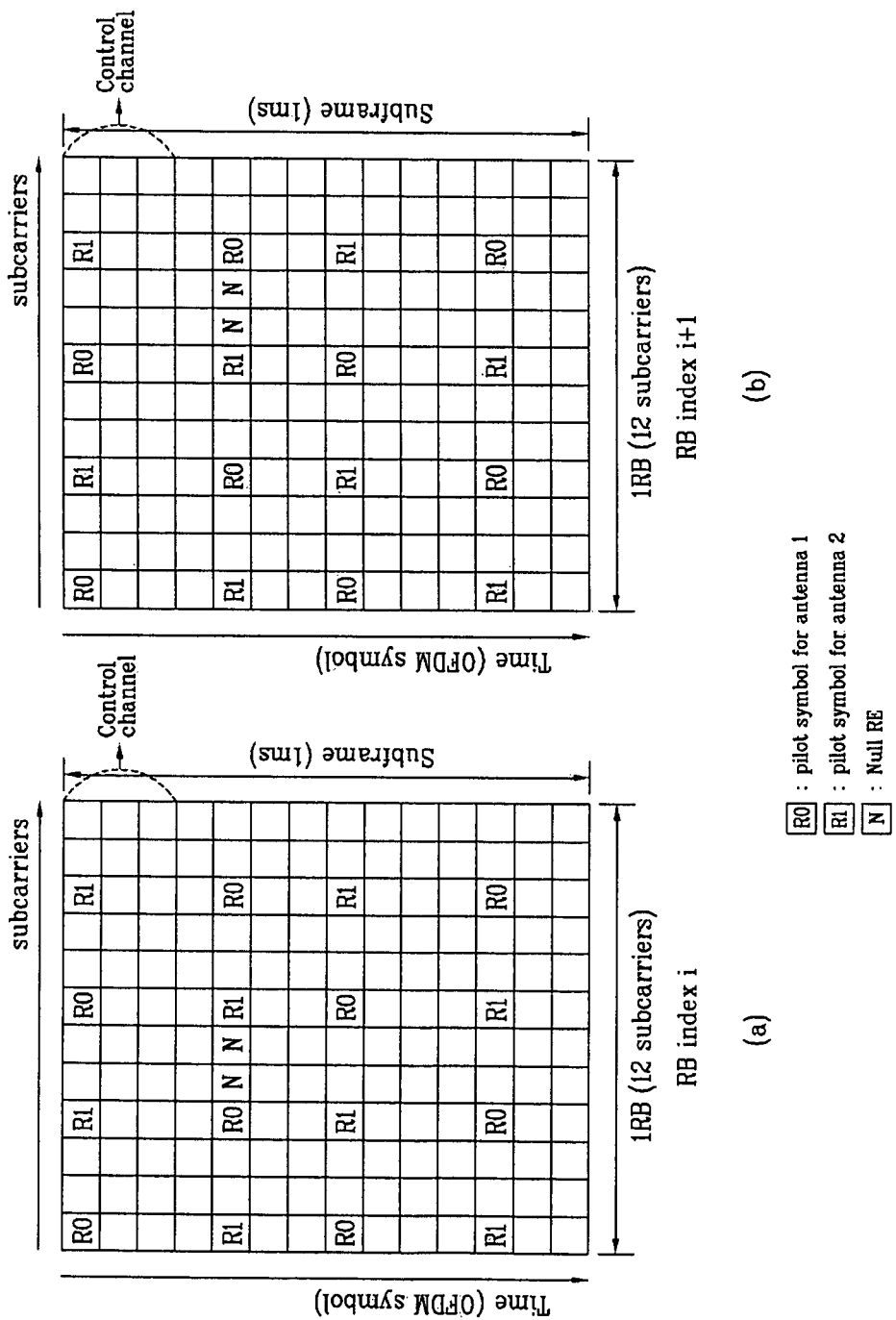
FIG. 9 is a diagram illustrating an example of a method of allocating a null RE in accordance with RB index, in accordance with another embodiment of the present invention.

FIG. 9 is a diagram illustrating an example of a method of allocating a null RE in accordance with RB index, in accordance with another embodiment of the present invention.

If the null RE is used for all resource blocks (RBs), great overhead of the null RE may occur. Accordingly, the null is used for only a specific RB index to reduce overhead and obtain proper magnitude of interference.

Referring to FIG. 9, the presence of the null RE can be determined in accordance with the RB index. For example, the null RE can be used only if there are provided an even number of RB indexes. In this case, overhead can be reduced by half in comparison with that the null RE is used for all RBs. Of course, the null RE can be used only if there are provided an odd number of RB indexes or RB of a specific number in accordance with the channel status or user's requirements. The RB index can be varied depending on time. Index of the RB which uses the null RE can be used using a fixed pattern. Alternatively, the RB index may be used by the base station in accordance with the status to notify the mobile station of the RB index per subframe.

Also, referring to FIG. 9, the null RE can be used in accordance with the transmitting antenna. Namely, the null RE can be used in only a specific transmitting antenna to efficiently control the power. For example, a null RE for the nth transmitting antenna can be used in a specific RB index of a multi-antenna system, and a null RE for the mth transmitting antenna can be used in another specific RB index.

FIG. 9(a) illustrates that a null RE is used for only the pilot symbol (R0) of the first antenna in the OFDM symbol region to which pilot symbols are allocated from the ith RB. If FIG. 9(a) is applied to a single cell system, interference from the second sector and the third sector can be measured.

FIG. 9(b) illustrates that a null RE is used for only the pilot symbol (R1) of the second antenna in the OFDM symbol region to which pilot symbols are allocated from the i+1th RB. If FIG. 9(b) is applied to a single cell system, interference from the first sector and the third sector can be measured.

Of course, FIG. 9(a) and FIG. 9(b) may be applied to the multi-cell system. In this case, interference from other neighboring cells can be measured.

Figure 10:
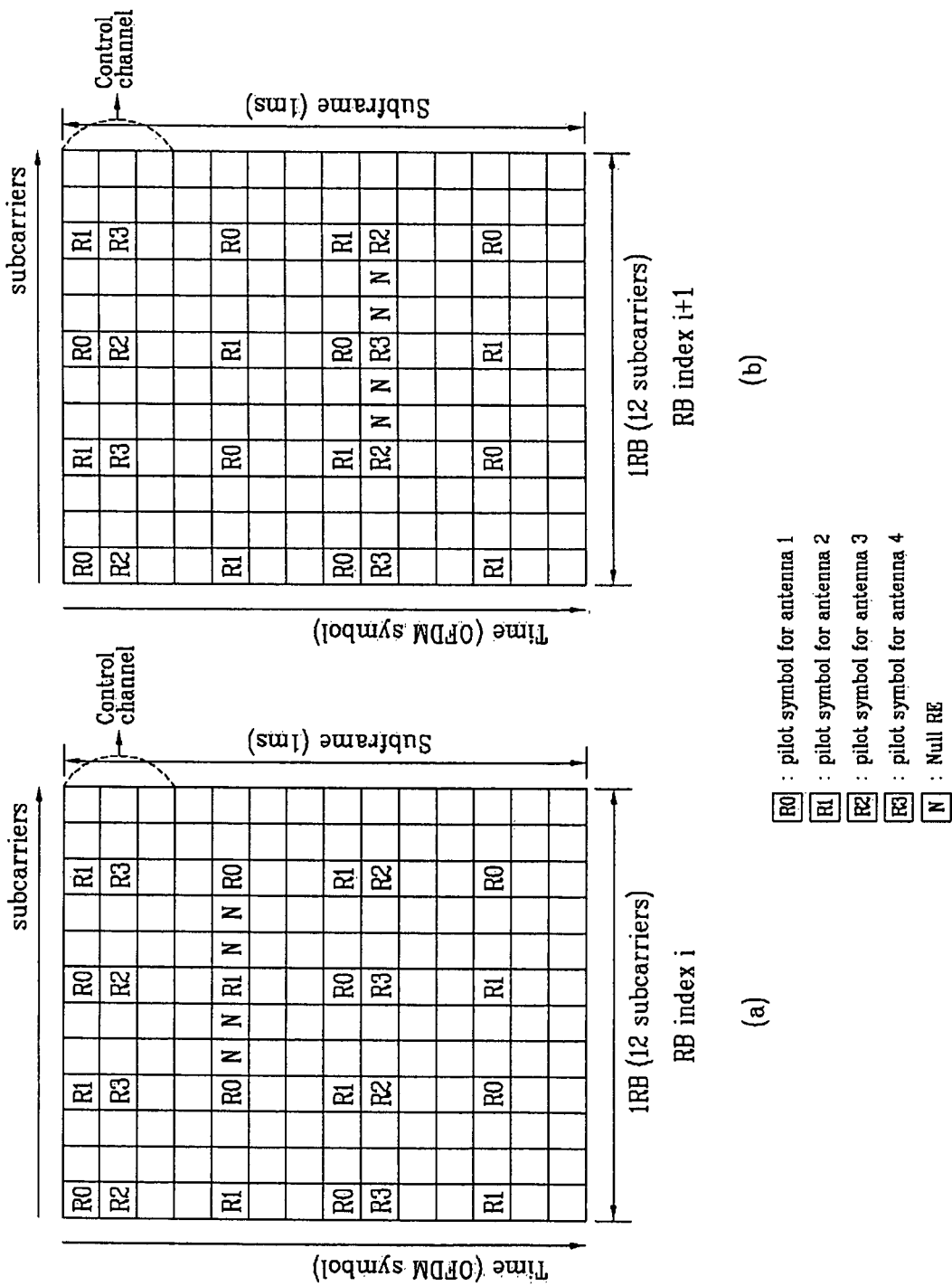
FIG. 10 is a diagram illustrating a method of using a null RE in only an OFDM symbol region to which pilot symbols of a specific transmitting antenna are allocated, in accordance with another embodiment of the present invention.

FIG. 10 is a diagram illustrating a method of using a null RE in only an OFDM symbol region to which pilot symbols of a specific transmitting antenna are allocated, in accordance with another embodiment of the present invention.

Referring to FIG. 10, a pilot signal structure for each transmitting antenna can be identified. At this time, the pilot symbols of the first and second antennas and the pilot symbols of the third and fourth antennas can be allocated differently from each other in accordance with index of the OFDM symbol region. Preferably, the null RE is applied to all OFDM symbols which include pilot symbols, so as to obtain interference of all transmitting antennas. However, if the null RE is used for a plurality of antennas, a problem occurs in that data transmission efficiency is reduced.

Interference of some antennas can be used in accordance with the channel status to predict interference magnitude of the other transmitting antennas. For example, the null RE can be applied to only the OFDM symbol region which includes pilot symbols of the first and second antennas, so as to obtain interference of the third and fourth antennas. Also, the null RE can be applied to only the OFDM symbol region which includes pilot symbols of the third and fourth antennas, so as to obtain interference of the first and second antennas.

FIG. 10(a) illustrates pilot symbols and null RE structure in the ith RB. FIG. 10(a) illustrates that the null RE is allocated to only a specific OFDM symbol region of the OFDM symbol regions to which the pilot symbol (R0) of the first antenna and the pilot symbol (R1) of the second antenna are allocated. In FIG. 10(a), interference of neighboring cells can be measured using the first antenna and the second antenna.

FIG. 10(b) illustrates pilot symbols and null RE structure in the i+1th RB. FIG. 10(b) illustrates that the null RE is allocated to only a specific OFDM symbol region of the OFDM symbol regions to which the pilot symbol (R2) of the third antenna and the pilot symbol (R3) of the fourth antenna are allocated. In FIG. 10(b), interference of neighboring cells can be measured using the third antenna and the fourth antenna.

As another example, the null RE structures of FIG. 10(a) and FIG. 10(b) can be used in due order. Namely, interference from neighboring cells can be measured using the first and second antennas in the i+1th RB, and interference from neighboring cells can be measured using the third and fourth antennas in the i+1th RB. Namely, interference from neighboring cells can be measured using different antennas in accordance with RB index.

Furthermore, as another example, the null RE can be used by sequentially changing the OFDM symbol regions to which pilot symbols of the specific transmitting antenna are allocated. The null RE can be used to obtain interference magnitude of the first and second transmitting antennas in a specific RB. Also, the null RE can be used to obtain interference magnitude of the third and fourth transmitting antennas in another specific RB.

Accordingly, if a plurality of antennas are used, the null RE is used in predetermined antennas to improve data transmission efficiency.

2. Method of Using Dedicated Null RE

The use of the aforementioned null RE structure can be determined in accordance with the location of the mobile station. For example, since the mobile station near the base station is little affected by interference from neighboring cells, the null RE is not used in this mobile station. Also, since the mobile station located in the cell boundary is affected by interference from neighboring cells, the null RE is used in this mobile station.

3. Method of Allocating Null RE According to Time

The use of the null RE and the location of the null RE can be changed in accordance with time or subframe index. For example, if ten subframes are defined by one wireless frame, the 0th subframe to the ninth subframe can exist in one wireless frame. In this case, the location of the null RE can be changed in accordance with subframe index(i). Also, since one subframe includes N OFDM symbols, the location of the null RE can be changed in accordance with OFDM symbol index(n). Namely, the null RE can be used for only a specific OFDM symbol among the OFDM symbols included in the specific subframe.

4. Method of Cooperatively Allocating Null RE in Multi-Cell

In order to exactly obtain interference magnitude of neighboring cells using the null RE, it is preferable that one null RE is used to obtain interference magnitude from one neighboring cell. Accordingly, if a null RE is used in a neighboring cell, the neighboring cell does not transmit data to the corresponding RE. In a multi-cell environment, it is preferable that a null RE is allocated so that each cell exactly obtains interference magnitude of its neighboring cell.

Figure 11:
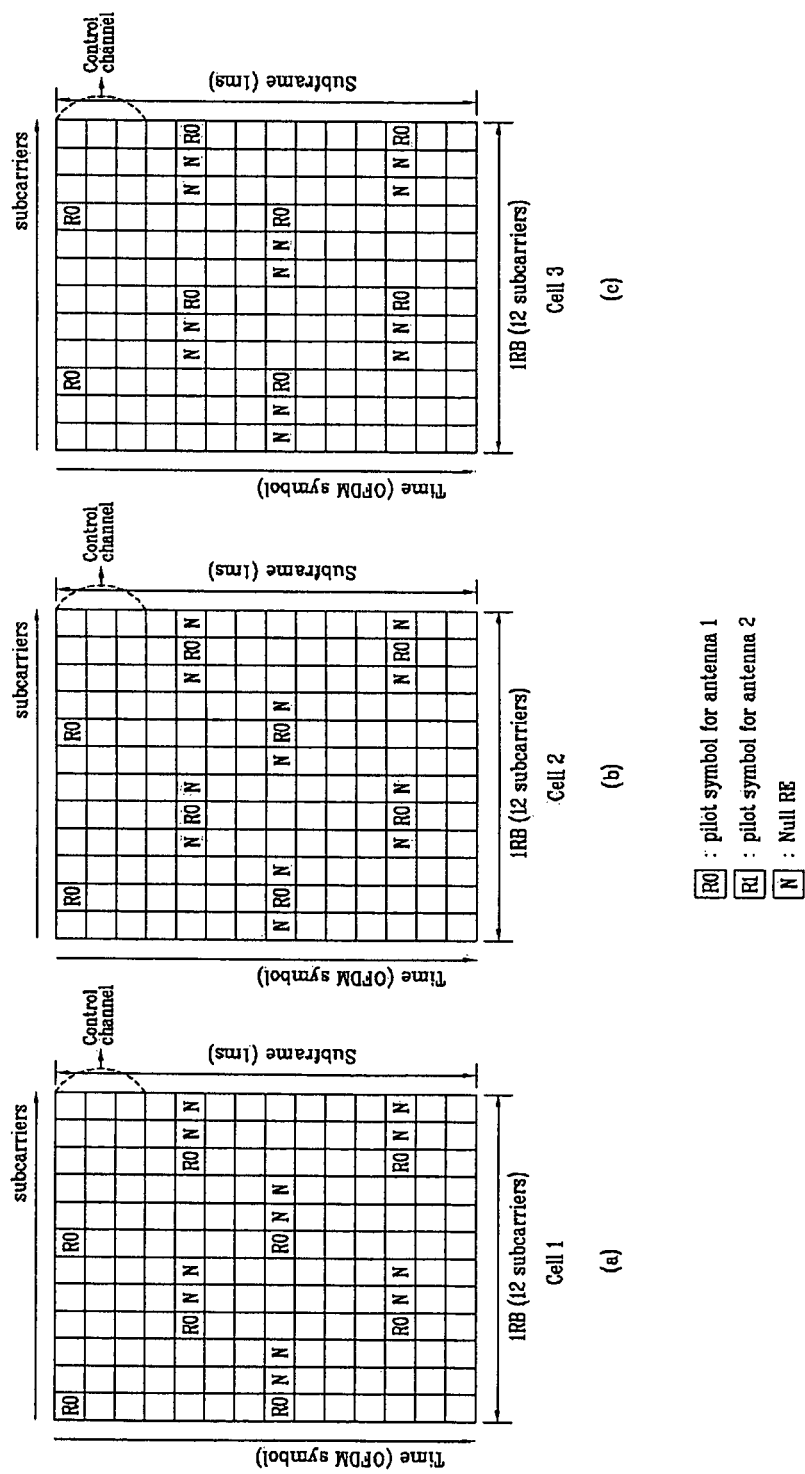
FIG. 11 is a diagram illustrating an example of a method of using a null RE cooperatively in a multi-cell environment, in accordance with one embodiment of the present invention.

FIG. 11 is a diagram illustrating an example of a method of using a null RE cooperatively in a multi-cell environment, in accordance with one embodiment of the present invention.

FIG. 11 illustrates that one transmitting antenna is exemplarily used. FIG. 11 can be applied to two transmitting antennas and four transmitting antennas. Referring to FIG. 11, the allocation location of the null RE and the allocation location of the pilot symbols can be exchanged with each other in three neighboring cells. For example, two null REs and one pilot symbols can be allocated to be adjacent to one another in a single OFDM symbol region. At this time, the location of the pilot symbols can be shifted to the location of the null RE in each cell. Namely, FIG. 11 illustrates a procedure of shifting pilot symbols for each cell on subcarriers and allocating them.

FIG. 11(a) illustrates the allocation location of the pilot symbol of the first cell, FIG. 11(b) illustrates the allocation location of the pilot symbol of the second cell, and FIG. 11(c) illustrates the allocation location of the pilot symbol of the third cell.

Referring to FIG. 11, the second cell and the third cell allocate the null RE to the resource element to which the pilot signals are allocated from the first cell, thereby effectively measuring interference from the first cell. Also, the first cell and the third cell allocate the null RE to the resource element to which the pilot signals are allocated from the second cell, thereby effectively measuring interference from the second cell. Also, the first cell and the second cell allocate the null RE to the resource element to which the pilot signals are allocated from the third cell, thereby effectively measuring interference from the third cell. However, in the OFDM symbol where the null RE is not used, it is not required that the null RE is applied to the OFDM symbol even though there is the RE to which the pilot symbols are allocated from the first cell.

INDUSTRIAL APPLICABILITY

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. It will be apparent that claims which are not explicitly dependent on each other can be combined to provide an embodiment or new claims can be added through amendment after this application is filed.

What is claimed is:

1. A method for supporting an interference measurement related to neighboring cells, the method performed by a base station and comprising:

allocating one or more reference signals to one or more first resource elements in a subframe;

allocating one or more null signals to one or more second resource elements in the subframe;

transmitting the one or more reference signals using the one or more first resource elements; and transmitting the one or more null signals using the one or more second resource elements, wherein an interference of the neighboring cells is measured using the one or more second resource elements, wherein the one or more second resource elements correspond to resource elements to which reference signals of at least one of the neighboring cells are allocated, wherein the one or more null signals are only allocated to a region of the subframe other than a control channel region, and wherein the control channel region is configured up to three OFDM (Orthogonal Frequency Division Multiplexing) symbols from a first OFDM symbol of the subframe.

2. The method according to claim 1, wherein the one or more null signals have no data.

3. The method according to claim 2, wherein a location of the one or more null signals is changed in accordance with a subframe index.

4. The method according to claim 2, wherein a use of the one or more null signals is changed in accordance with a subframe index.

5. The method according to claim 2, wherein a number of the one or more reference signals is changed in accordance with a number of antennas.

6. The method according to claim 2, wherein the first resource elements are allocated to either a data channel region or the control channel region of the subframe.

7. The method according to claim 2, wherein an interference of the at least one of the neighboring cells is measured by using the one or more second resource elements.

8. The method according to claim 2, wherein an interference of the at least one of the neighboring cells is measured by using the one or more reference signals.

9. A base station (BS) for supporting an interference measurement related to neighboring cells, the BS configured to:

allocate one or more reference signals to one or more first resource elements in a subframe;

allocate one or more null signals to one or more second resource elements in the subframe;

transmit the one or more reference signals using the one or more first resource elements;

transmit the one or more null signals using the one or more second resource elements, wherein an interference of the neighboring cells is measured using the one or more second resource elements, wherein the one or more second resource elements correspond to resource elements to which reference signals of at least one of the neighboring cells are allocated, wherein the one or more null signals are only allocated to a region of the subframe other than a control channel region, and wherein the control channel region is configured up to three OFDM (Orthogonal Frequency Division Multiplexing) symbols from a first OFDM symbol of the subframe.

10. The apparatus according to claim 9, wherein the one or more null signals have no data.

11. The apparatus according to claim 10, wherein a location of the one or more null signals is changed in accordance with a subframe index.

12. The apparatus according to claim 10, wherein a use of the one or more null signals is changed in accordance with a subframe index.

13. The apparatus according to claim 10, wherein a number of the one or more reference signals is changed in accordance with a number of antennas.

14. The apparatus according to claim 10, wherein the first resource elements are allocated to either a data channel region or the control channel region of the subframe.

15. The apparatus according to claim 10, wherein an interference of the at least one of the neighboring cells is measured by using the one or more second resource elements.

16. The apparatus according to claim 10, wherein an interference of the at least one of the neighboring cells is measured by using the one or more reference signals.

* * * * *